United States Patent Office 3,278,897

Patented Oct. 11, 1966

3,278,897

METHOD AND APPARATUS FOR ERROR CORRECTION OF INFORMATION RECORDED IN A COMBINED PRINTING AND RECORDING MACHINE

Charles George Ashby, High Wycombe, and Kenneth Lees, Bristol, England, assignors to The Imperial Tobacco Company (of Great Britain and Ireland), Limited, Bristol, England, a company of England Filed Dec. 10, 1962, Ser. No. 243,549
25 Claims. (Cl. 340—146.1)

This invention relates to manually operable machines adapted to print information on a sheet, some at least of said information being recorded for feeding into a computing machine. For clarity such a machine is hereinafter referred to as a "typing and recording" machine.

The recording medium may comprise a paper tape or cards, the information being recorded therein by punching appropriate perforations, or the recording medium may comprise a magnetisable tape, such tapes or cards then being fed into a computing machine.

Apparatus of the kind described is particularly useful when it is desired to type instructions on a sheet, for example the quantity and price of goods, that may then be sent to the appropriate office so that the goods are despatched, while corresponding information is recorded for feeding into a computing machine in order to prepare an invoice.

It is mentioned above that selected characters are recorded and this expression is used because it may be desired to type some descriptive matter as well as, say, the quantity and price of the goods, and this descriptive matter is not required to be recorded for feeding into a computing machine. Provision is therefore made on the apparatus whereby the recording mechanism is only put into operation when characters are being printed that have to be fed into the computing machine.

When operating apparatus of the kind described errors sometimes occur, and these must of course be corrected.

Heretofore the correction of errors on such apparatus has presented difficulties in that the operator has to manipulate the recording medium so as to locate the error and move it into a suitable position to cancel it and then return said medium to a suitable position for re-recording, erase or cancel the error on the sheet, and then print and record the corrected characters.

It is an object of the present invention to provide apparatus for the correction of error in characters printed in a plurality of printing positions on a sheet and in a simultaneously produced recording on a record medium. Another object of the invention is to provide apparatus on and in association with a combined printing and recording machine that shall facilitate the correction of error both on the printed sheet, and on the corresponding recording medium.

It is a further object of the present invention to provide a combined printing and recording machine and means for operating same whereby an error may be corrected on the recording medium without interfering with its continuity and in which the correction of the error may be viewed on the printed sheet.

According to one feature the present invention consists in a method for the correction of error in characters printed on a sheet and in a simultaneously produced recording on a record medium corresponding to recordable characters at pre-selected positions on said sheet, said method comprising the steps of memorising or identifying the positions of the printing and recording of recordable characters as they are printed, retuning said sheet and said record medium to places suitable for error correction, with accompanying cancelling of the corresponding part of the recording and print, correcting the erroneous printed matter and re-recording the corrected recordable characters on said record medium.

Preferably the cancellation of the recording is by obliteration thereof and re-recording is effected in continuity of the obliterated recording.

Preferably also the sheet is returned to the start of a field of error which contains, but does not necessarily commence with, the observed printed error, correction of error including obliteration of the record and print of all recordable characters within said field of error, followed by reprinting of all said recordable characters within that field of error and including correction of previous printed error.

The memorizing or identifying of recordable characters may be effected by mechanical means conditioned for operation during printing of said characters.

The present invention also consists in a method for the correction of error in characters typewritten on a sheet and in a record simultaneously produced in an associated punch unit, and consisting of perforations in a tape corresponding to selected ones of the typed characters, said method comprising the steps of memorizing or identifying by mechanical means on a typewriter the positions of recordable characters at pre-selected positions on said sheet as the tape is perforated during normal movement of the sheet-holding typewriter carriage, back-spacing said typewriter carriage with the sheet and back-spacing said tape in said punch unit both by power-operated means to the commencement of a field of error containing an erroneous character, thereafter obliterating by over-printing all typed characters in said field of error and over-perforating the tape to cancel those recorded characters previously represented by perforations in said tape, and re-typing the corrected typed characters on the sheet with simultaneous re-recordal of memorised or identified positions of recordable characters beyond the cancelled perforations in the tape.

Sheet and tape back-spacing and all subsequent steps may result automatically from a single manual control operation.

Alternatively sheet and tape back spacing may result automatically from a first manual control operation, and error cancellation and subsequent steps result automatically from a second manual control operation.

The present invention further consists in a method of controlling an electrically operated typing and recording machine so that a character printed in error on a sheet in the machine carriage, and correspondingly recorded on a record medium may be corrected, comprising the steps of key-operating a first means to render effective a first electric circuit to return the sheet-carrying typewriter carriage (with accompanying return movement of said record medium) to an error-correcting position, and then (by over printing) cancel the error and all subsequent printed characters and cancel the record on the recording medium and to return the carriage to the error-correcting position, whereupon a re-recording of the cancelled record is made as the carriage retraces its original movement.

According to another feature the present invention consists in apparatus for the correction of error made in a line of printed characters, selected ones of which are simultaneously recorded on a record medium, comprising a memory or identifying device adapted for conditioning in correspondence with said recording of selected characters, power-operated means for returning at least said sheet to a correction position for correction of an observed error, power-operated means for cancelling recordings extending from said correction position to the end of said line of characters including said erroneous character, means operable consequent on correction of the error for re-recording the cancelled recordings on said record medium, and means for resetting to normal the conditioned memory or identifying device.

According to another feature the present invention consists in apparatus for the correction of error in a line of characters typed on a sheet in the carriage of an electrically operated typing machine which simultaneously controls recordal of selected characters on a record medium, said apparatus comprising means settable on the type-printing of a recorded character for memorizing or identifying the positions of said printing and recording, electric control circuitry operable to back-space said carriage with the printed sheet and associated record medium to the point of error and to set all unset memorizing or identifying means, to cancel the error and all subsequent characters in the line on the sheet, to cancel the corresponding recorded characters on the record medium, and to back-space the carriage with the printed sheet to the error, so that corrected characters as they are re-typed on the sheet are re-recorded on the record medium beyond the cancellation therein, the extent of the back-spacing movement of the carriage and record medium and of their cancelling movement being controlled by the first and last memorizing or identifying means.

According to another feature the present invention consists in apparatus for the correction of error in characters typewritten on a sheet and simultaneously selectively recorded on a record medium as perforations therein, comprising an electrically-powered machine for typewriting characters on a sheet, a punch unit for perforating said record medium, an electrical control circuitry associated with said typewriting machine and said punch unit, said typewriting machine incorporating a mechanical memory or identifying device having movable elements adapted to be conditioned in correspondence with the selected characters recorded as perforations by said punch unit in said record medium, while the control circuitry includes a sensing device responsive to conditioned elements of the memory or identifying device, and switch means operated by a key on the typewriting machine, operation of said switch acting to back-space the sheet-holding carriage of the machine in step with return movement of the associated record medium in said punch unit to a point from whence error correction of typed and perforated characters can be effected, to cancel the error and all subsequent characters on the sheet and record medium, and to back-space the carriage to the error, the electric circuitry being modified automatically to provide the rearward and forward movements of the carriage and record medium by alteration of the sensing device responsive to the conditioned memorizing or identifying elements.

According to a still further feature the present invention consists in apparatus for controlling an electrically-operated typing machine and co-acting punch recording mechanism so that a character printed in error on a sheet in the carriage of said machine and selectively recorded on a tape by said punch mechanism may be corrected, said apparatus comprising means set on the printing of a recordable character for memorizing or identifying the positions of said printing and recording, a primary electric control circuit rendered effective by the operator to return the carriage and the tape to error correcting positions, a secondary electric circuit rendered effective by the operator to cancel the error and all subsequent characters on the sheet and tape, and to back-space the sheet-holding carriage of the typing machine to the error position, whereby characters may then be re-typed on the sheet and simultaneously re-recorded on the tape beyond the cancellation, the extent of the back-spacing and cancelling movement of the tape being controlled by said set memorizing or identifying means.

Preferably the control circuitry includes sensing means adapted to be set by a memorizing or identifying element movable into either a set position or a reset position whereby, according to the position of said sensing means the electric circuit is modified so that initially it operates the mechanisms adapted to return the carriage and tape to the place of error, then to cancel characters both on the sheet and the tape, and finally to return the carriage only to the error so that corrected characters, that may then be typed on the sheet, may be re-recorded on the tape beyond the cancellation.

One embodiment of the present invention is diagrammatically indicated in the accompanying drawings in which.

Figure 4:
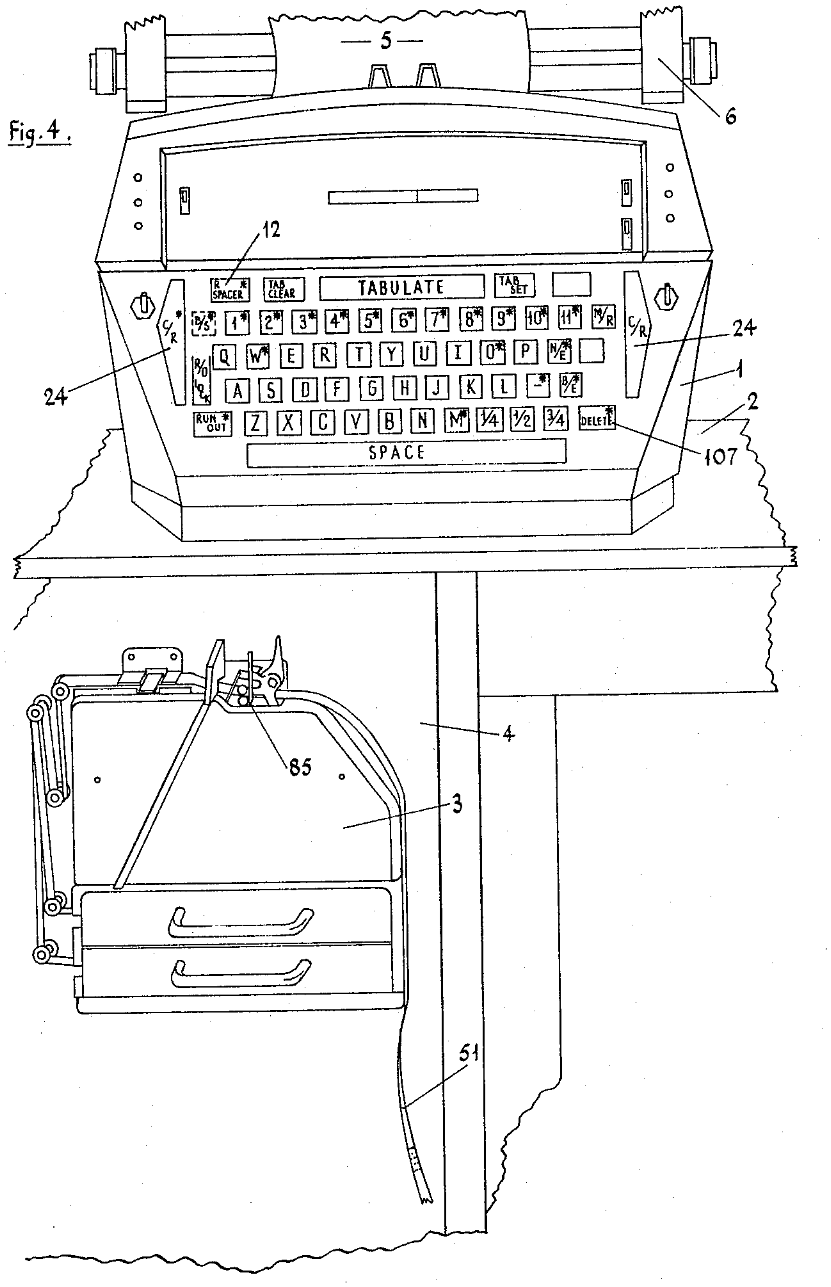
FIG. 4 is a perspective drawing showing a typewriter and associated punch mounted on a desk.

Referring to FIG. 4, a typewriter 1 is mounted on a table top 2 and it is electrically associated with a punch 3 that is mounted on the table leg column 4.

In normal operation of the combined typewriter and punch a sheet 5 (e.g. the order form illustrated in FIG. 1) is fed into the carriage 6 of the typewriter. The carriage 6 moves incrementally from right to left as a line is being printed in the customary manner thereby presenting a plurality of printing positions to the printing reference position of the typewriter keys. It will be observed that the sheet 5 is divided into a number of separate columns, the column 7 being used to define the goods concerned while in the columns 8, 8–1, 8–2, 8–3, 8–4, are the price, quantity, and any other details concerning the order it is desired to record.

At the upper end of the columns 8 to 8–4 there is entered general particulars of the order, these spaces are marked G8 to G8–4 and P8 to P8–4. The right-hand columns, as viewed in FIG. 1, may of course also be used.

While the carriage is in the position to type in column 7, the type keys operated act only to type information on the sheet.

When however the carriage reaches either column G8, P8 or 8, the electric circuitry associating the typewriter 1 and punch 3 is modified, as hereinafter more fully explained, so that all characters typed in the columns G8 to G8–4, P8 to P8–4 and 8 to 8–4, are also recorded by punching perforations on the tape. These columns G8 to 8–4 accordingly are hereinafter referred to as the "punch zone." The columns of the punch zone are separately recorded i.e., recorded as recognizable groups, on the tape in that, after the colmun G8, P8 or 8 has been completed, a "number end" sign (in the drawing an oblique stroke "/") is printed on the sheet and the printing of this / acts to perforate a corresponding code on the tape. The computing machine into which the tape is subsequently fed recognizes said perforated code as a number and sign. The other columns G8–1 to G8–4, P8–1 to P8–4, and 8–1 to 8–4 are similarly recognized as groups of numbers by the computer.

The commencement of the punch zone is indicated on the sheet by a colon and the printing of the colon acts to perforate a corresponding code, recognizable by the computer, on the tape.

The printing and consequent perforating of the punch zone commencement (hereinafter referred to as "block end") and number end signs may be effected by depressing B/E (block end) and N/E (number ends) keys on the typewriter 1, this action modifying the electric circuitry to bring the punch into operation and separate the columns in the punch zone respectively.

Figure 10:
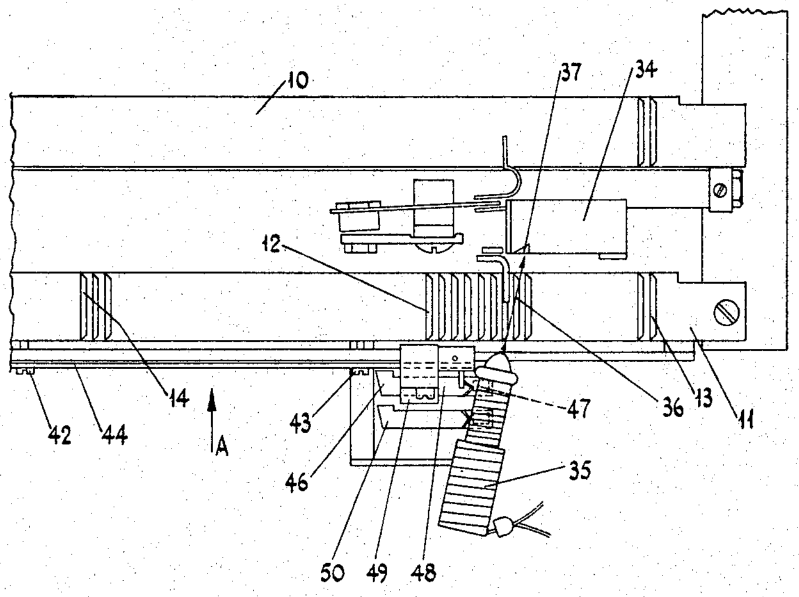
FIG. 10 is a partial plan view of the tab bar and its associated mechanism.
Figure 11:
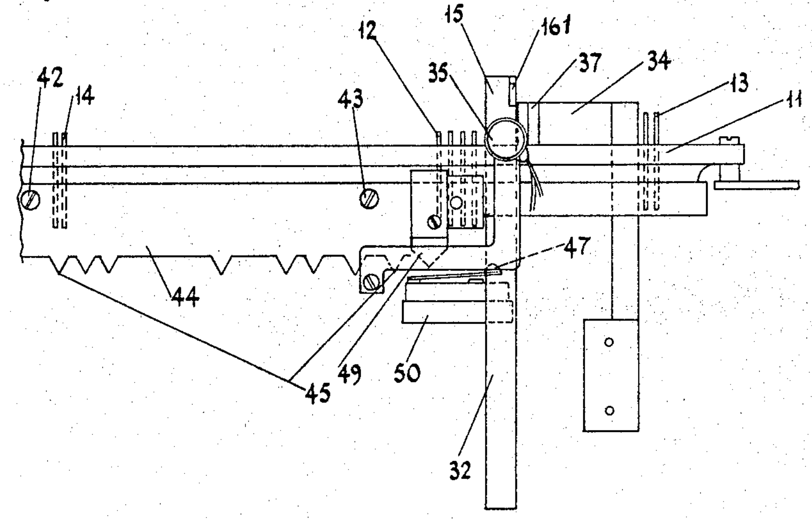
FIG. 11 is a view in the direction of the arrow A in FIG. 10.

It is preferred, however, to modify the circuitry automatically and FIGS. 10 and 11 illustrate mechanism that provides for this automatic modification, such mechanism being hereinafter more fully described.

All numbers from 1 to 11, the "—" sign, the "0," the M (1000) and the block end and number end signs can be printed and perforated when the carriage is in the punch zone position, making 16 signs in all that can be printed and perforated in the punch zone.

Figure 2:
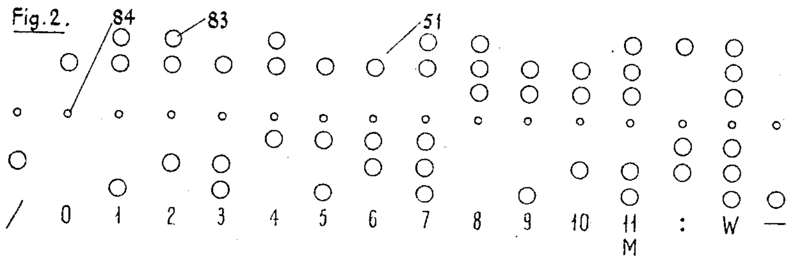
FIG. 2 is a section of tape perforated to indicate all characters that may be recorded.

It will be observed from FIG. 2 that the punched code for M (1000) is the same as the code for 11. When 11 is to be perforated in any of the columns G8 to G8–4, P8 to P8–4, or 8 to 8–4, it is effected by typing two ones, but if it is desired to perforate eleven in, for example, a pence column, e.g. column 16, then the key for eleven (which as stated above has the same code as M) is depressed so that the code for M or 11 is perforated to correspond with that column. This is automaticlly recognized by the computer. Thus there are sixteen signs as above mentioned but seventeen keys.

Briefly the modification of the electric circuitry, above referred to, when the block end key is depressed (or when automatically operated as shown in FIGS. 10 and 11) is effected in the following manner.

Each key that controls a character that may require to be perforated in the punch one, as well as printed on the sheet, includes a switch 9 (see FIG. 5), and depression of the block end key (or automatic operation thereof) acts to close an electric circuit (switch 100 FIG. 12) that directs a current to one terminal of each of the switches 9 so that when any of said keys is depressed and its switch 9 is closed, this completes another circuit that operates the punch. A fuller description of this modification of the electric circuitry is hereinafter given.

When a line e.g. G8 to G8–4, P8 to P8–4 or 7 and 8–1 to 8–4 has been completed, depressing either of the keys 24 (carriage return) acts to return the carriage and ırn up the platen ready for the next line to be typed. It also acts to break the punch zone perforating circuit, i.e. open the switch 100.

The following keys in the top line of the typewriter 1, i.e. Tab clear, Tabulate and Tab set are normal typewriter keys for clearing tabs, operating the tabulator and setting the tabs.

The above is a brief description of the normal operation of the combined typewriter and punch and the electric circuitry to operate the parts will be described in conjunction with that for the correcting mechanism in accordance with the present invention.

Figure 1:
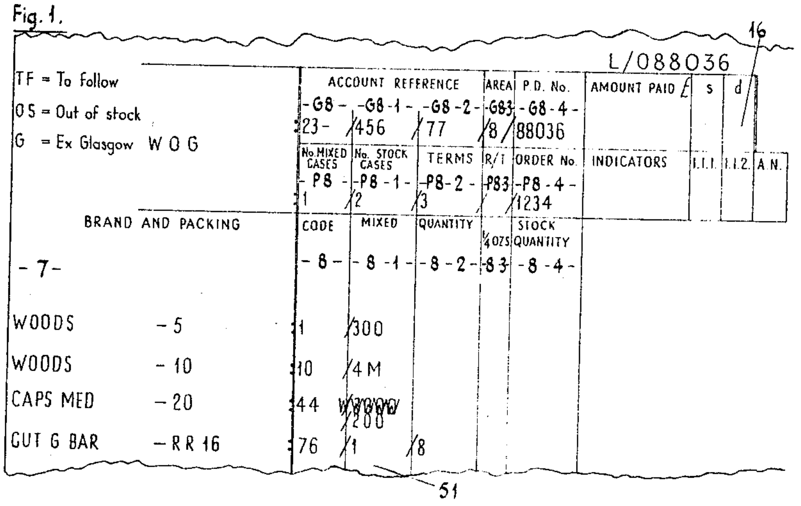
FIG. 1 illustrates a typical order form as printed on a typewriter.
Figure 3:
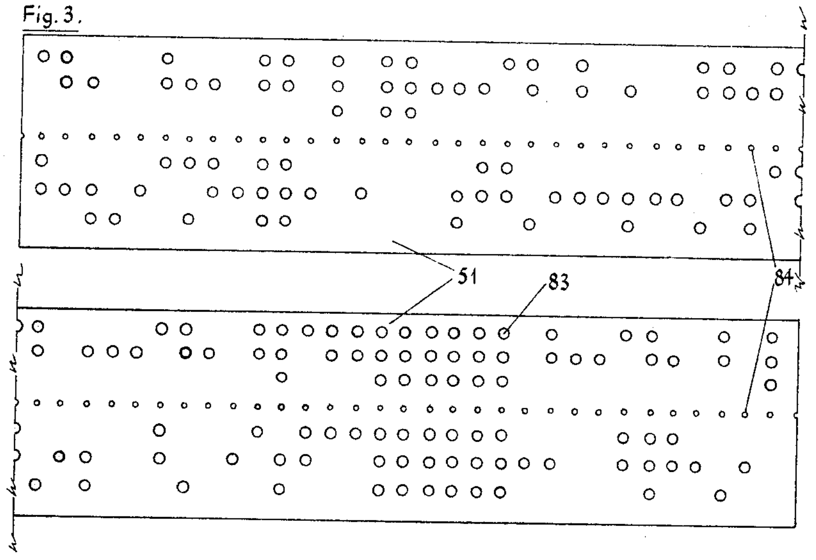
FIG. 3 is a section of tape perforated in a punch associated with the typewriter, said tape being perforated to correspond with the numbers typed in the punch zone of FIG. 1.

Referring to FIGS. 1 to 3, typical figures for a sheet 5 have been filled in in FIG. 1, while in FIG. 3 the corresponding code perforations have been shown on a tape 51. FIG. 2 shows a complete set of code perforations reading from left to right as follows N/E (/), 0, 1, 2, 3, 4, 5, 6, 7, 8, 9, 10, 11, M (1000) B/E (:), cancel (W) and —. Cancel (W) or delete, not previously referred to, is for error correction and the — (see column G8) is a sign recognized by the computer to indicate the start of a new order. The letter "W" is used for cancellation in preference to the rather more usually used X.

An examination of FIGS. 2 and 3 will show that the tape 51 is adapted to receive 6 perforations 83, transversely, these being arranged in two sets of three on either side of a longitudinally punched set of smaller holes 84. The holes 84 are for co-operation with driving mechanism 85 in the punch 3. It will be observed that each code is represented by an odd number of perforations except for the cancel code, and the reason for this is concerned with the normal operation of the computer. If, for some reason, say the code for the number two is incorrectly perforated by the omission or addition of one perforation, thus making an even number of perforations, the computer recognizes this as an error and passes over the position of the tape without feeding out any information. Thus in the present invention the cancellation code of six holes will tell the computer to pass over this position of the tape and move on to the next without feeding out any information.

The above described machine is modified to provide for error correction in the following manner:

Referring first to FIGS. 10 and 11, 10 is the normal tabulator bar of the typewriter 1 while 11 is an additional tab bar mounted on the carriage behind the bar 10, said bar 11 carrying a plurality of slidable tabs, one tab being provided, at least for each printing position on the typewriter carriage where a recordable character is printed.

Figures 6, 7:
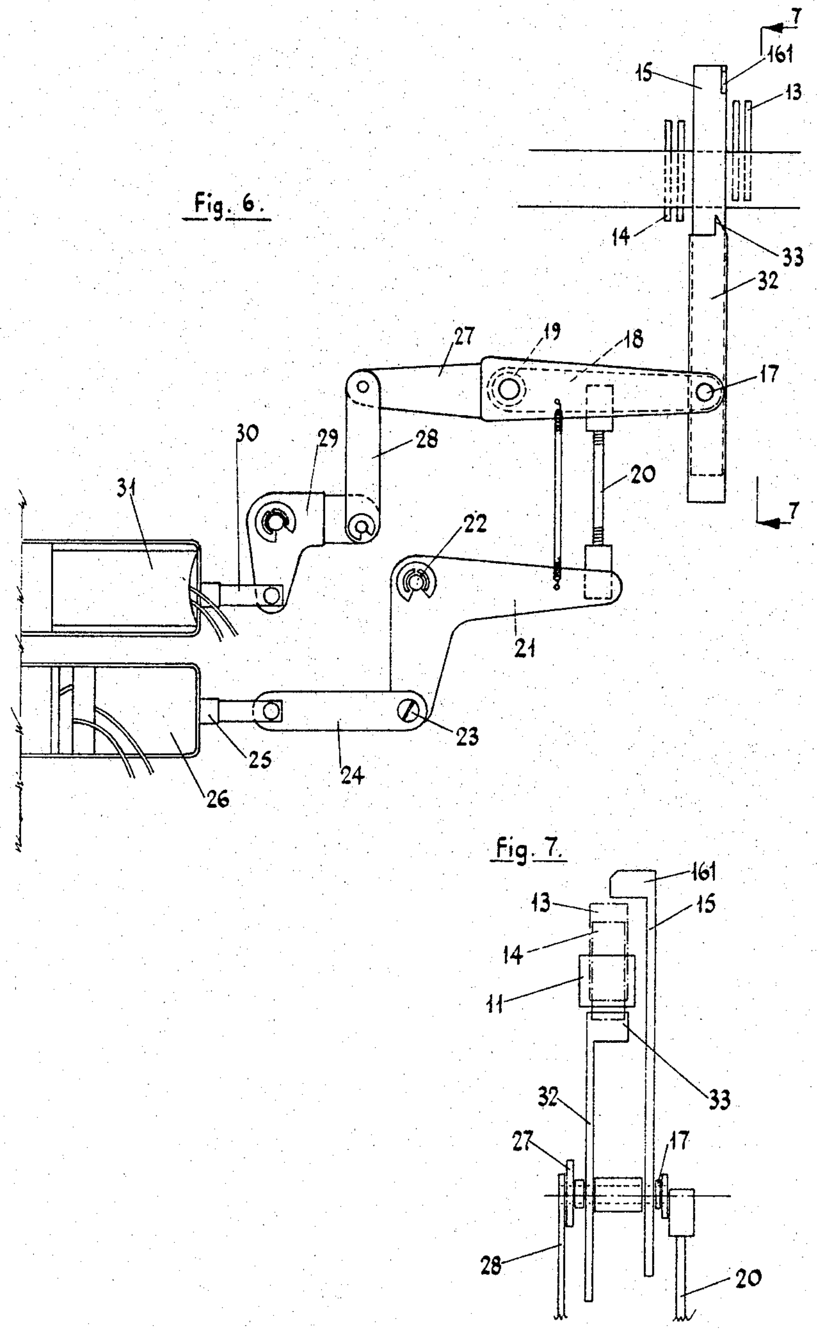
FIG. 6 shows the solenoid controlled operation of tab setting and tab resetting mechanism, FIG. 7 being a view on the line 7—7 of FIG. 6.

The tabs in their upper position 13 are said to be unset and in their lower position 14 are said to be set. The mechanism for setting the tabs is more clearly illustrated in FIGS. 6 and 7 in which 15 is a slidable strip which is hooked at 161 so that when slid downwards, as viewed in said figures, the hook engages the tab immediately below it and so moves the tab to its lower (set) position 14.

The strip 15 is guided so that it may only move in a vertical path and it is pivotally connected at 17 to an arm 18 pivoted at 19 to the typewriter frame. A rod 20 connects the arm 18 to a rocker 21, pivoted at 22, said rocker being connected by a bolt 23 to a link 24 that is in turn connected to the armature 25 of a solenoid 26. The circuit to the solenoid 26 is adapted to be completed by the depression of any key that includes a switch 9 when the carriage 6 is in position for typing in the punch zone, whereby each time said key is depressed the corresponding tab is moved to its set position 14 by downward movement of the strip 15 engaging through its hook 161 said corresponding tab.

Resetting of the tabs to their upper unset position 13 is effected through somewhat similar linkage 27, 28, 29 moved by the armature 30 of solenoid 31. This solenoid is energized by the operation of a carriage return key, and said linkage 27, 28, 29 acts to raise a bar 32. The bar 32 is chamfered at 33 so that when it is raised as above described, said chamfer lies in the path of the lower end of set tabs 14, whereby, as the carriage moves to the commencement of the succeeding line, the tabs rub against the chamfer and are consequently slidden to their upper unset condition 13.

A photo electric cell 34 is mounted on a fixed part of the typewriter 1 forward of the tab bar 11, while a light source 35 is mounted on a fixed part behind said tab bar whereby the light beam 36 is directed at a window 37 in said cell, the arrangement being such that if a tab is in unset position 13 it acts to obturate the beam 36 from the cell 37, but if a tab is set (position 14), the light will shine on the window and so operate the cell.

The photo electric cell 34 is of a known construction in that the interruption of the light is used to control a weak current that is amplified to operate a relay (an electric switch 38).

The electric switch 38 concerned (see FIG. 12), in combination with the photo-electric cell 34 is referred to as a sensing switch. The said switch 38 is a multi pole switch that is to say it includes two parallel arms 90 each pivoted at one end on a common axis, but insulated from one another, while the other ends of said arms may each be connected to one of two terminals. The two arms move together, according to the operation of the photoelectric cell. The two switch arms are shown as separate switches in FIG. 12 but to show their interconnection, as above described, the two switches have been numbered as follows. The common axis, at which the two arms are insulated from one another, 39, 39–1, the two terminals for each arm 40, 41 and 40–1, 41–1, and the switches themselves 38 and 38–1.

It will be recalled that the punch zone can be brought into operation by depressing the block and (:) key, but that it is preferred to do this automatically. This automatic initiation of the punch zone and number end signs will now be described.

To the rear of the tab bar 11 there is secured by means of screws 42, 43 a strip 44. The strip 44 is constructed with projecting teeth 45 spaced at intervals to correspond with the different columns G8 to G8–4, P8 to P8–4 and 8 to 8–4. A micro switch 46 is bolted to the fixed machine frame in such a position that as the teeth 45 move across said switch, during movement of the carriage, each tooth in turn strikes the head 47 of the switch arm 48 to close said switch, the switch arm being resilient so that it automatically breaks as a tooth moves clear. The switch 46 operates the number end (/) sign.

In a somewhat similar manner a tooth 49 is secured to the rear of the tab bar 11 but this, as will be seen more clearly in FIG. 10, is cranked rearwardly so that as it moves with the carriage it closes another micro-switch 50, spaced behind the switch 46. The switch 50 operates the block end (:) sign.

In order to correct errors, in accordance with the present invention it is necessary to be able to backspace the carriage and to backspace the punch.

"Back-spacing" the carriage must not be confused with "carriage return." Carriage return is the normal movement that takes place when a line has been completed and it consists in returning the carriage in one movement by depressing the key 24 back to the left-hand margin (as set by the normal typewriter mechanism) and turning up the platen one space (or more) ready for the next line of type.

"Back-spacing" of the carriage on the other hand is a step by step motion set in operation by depressing a back-spacing key 12 and the movement continues automatically until the carriage reaches the first unset tab to the left on the bar 11 as viewed in FIG. 4. If the error has not then been reached the back spacing key 12 is again depressed so that the step by step motion recommences and continues until finally the error is reached.

Figure 8:
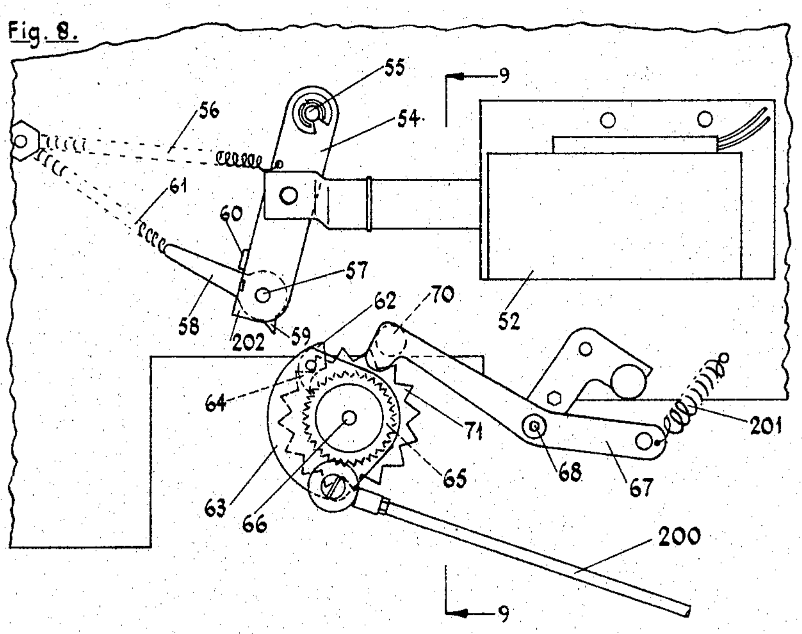
FIG. 8 shows the punch back space mechanism, FIG. 9 being a view on the line 9—9 of FIG. 8, but omitting the non-return lever 67 to avoid confusion.
Figure 9:
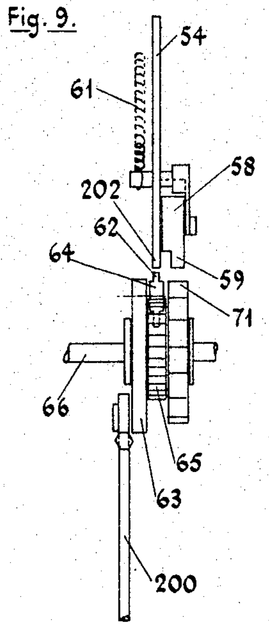

The punch 3 has to be modified to permit of back-spacing and the mechanism to effect this is illustrated in FIGS. 8 and 9. In general the punch 3 is a normal punch containing a paper reel and six perforating pins, operated electrically in association with the typewriter, so as to drive the tape step by step and punch it with a code corresponding to characters printed in the punch zone. The punch tape moves incrementally thereby presenting a plurality of punch positions to an encoding reference position of the punch apparatus.

The paper strip 51 is fed step by step by mechanism 85 and punched so that, as will be seen from FIG. 4, it trails on to the floor. When a predetermined length of tape has been perforated, it is torn off and reeled with the torn off end at the centre or core of the reel ready for feeding into the computing machine.

Referring to FIG. 8, which illustrates the punch driving and back-spacing mechanism 200 is a connecting rod adapted to be moved in the direction of the arrow A each time the tape is to be moved on one step, i.e., the distance between one row of perforations and the next. The rod 200 is pivotally secured to a quadrant 63 that is freely mounted on an axle 66. The quadrant 63 carries a pawl 62 spring urged so that normally its tooth 64 engages one of the teeth of a ratchet wheel 65, said ratchet wheel being secured to the axle 66.

By the above arrangement, each time the rod 200 moves in the direction of the arrow A, it rocks the quadrant 63 so that the tooth 64 of the pawl 62 rotates the ratchet wheel 65 through an angle equal to two teeth thereof, thus turning the axle 66 a corresponding amount to drive the punch tape. A non-return lever 67, pivoted at 68, is biassed by a spring 201 so as normally to engage its toothed end 70 with a tooth of a star wheel 71, the star wheel being mounted on the axle 66. It will be observed that the pitch of the teeth on the star wheel is double that of the ratchet wheel. When, as above described, the ratchet wheel 65 and with it the star wheel 71 are moved by the pawl 62 through an angle equal to two teeth of the ratchet wheel, the non-return lever is forced out of engagement with the star wheel 71, rides over the succeeding tooth and snaps into the space behind it to prevent over drive or return drive when the quadrant returns. The back spacing mechanism for the punch comprises a solenoid 52 adapted to be operated intermittently and thereby to oscillate an arm 54 about its pivot 55, said arm 54 being moved to the right, as viewed in FIG. 8, by the solenoid and being returned to the position shown in that figure by a spring 56.

Pivotally secured to the arm 54 at 57 is a rocker 58 provided with a driving tooth 59 and maintained against clockwise movement (as viewed in FIG. 8) by means of a stop 60 and it is biassed to assume the position shown in FIG. 8 by a spring 61.

The back spacing mechanism operates in the following manner. When the solenoid 52 is operated, as hereinafter more fully explained, it rocks the arm 54 counter-clockwise. During this movement the lower end 202 of the lever 54 strikes the upper end of the pawl 62 to pivot it clear of the teeth in the ratchet wheel 65 while further movement of said arm 54 brings the tooth 59 into engagement with a tooth of the star wheel 71 to turn said wheel one tooth in the clockwise direction (thus back spacing the tape), the non-return lever being forced out of engagement with the star wheel and snapping in behind the next tooth to prevent overdrive and return drive of the axle 66.

On the return motion of the arm 54 the rocker 58 pivots against its spring 61 to clear the teeth of the star wheel and the lower end of said arm 54 releases the pawl 62 to permit it to engage the appropriate tooth of the ratchet, i.e., two teeth in the clockwise direction.

Figure 5:
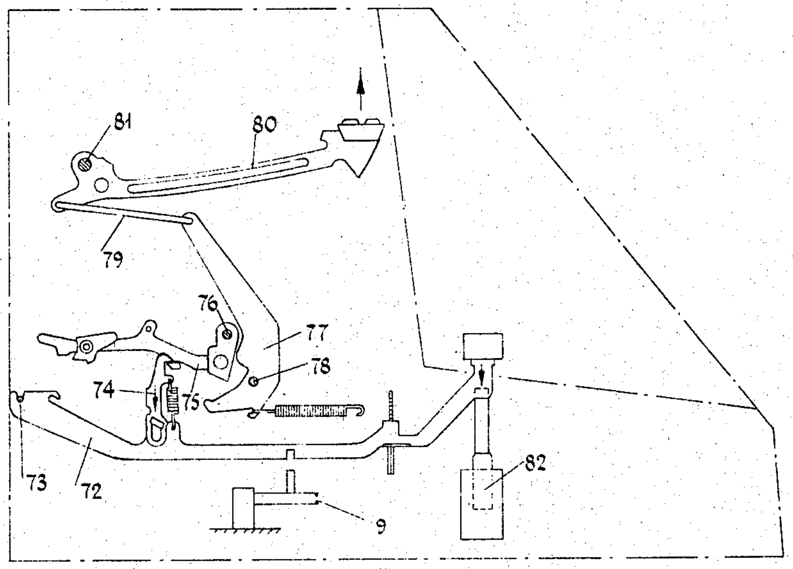
FIG. 5 shows a type key lever with type bar and their associated linkage.

Referring to FIG. 5, it has already been mentioned that each of the typewriter keys that controls a character that may require to be perforated in the punch zone as well as printed on the sheet includes a switch 9; these switches close the circuit to the corresponding encoding matrix 101 in the punch so that the correct code for each key is perforated. It will be appreciated that as each key (of which FIG. 5 is a typical example) is depressed it rocks its lever 72 about its pivot 73 which through a drag link 74 causes a power action to be applied to a push link 75 and said push link 75 rocks a bell crank 77 about pivot 78 which in turn through a rod 79 raises the type bar 80 about its axis 81 to print the type on the sheet. At the same time of course it closes the switch 9.

As well as switches 9, operable when the keys are depressed, the colon (block end), the / (number end) and W (cancel) may be solenoid operated by solenoids 82. These solenoids 82 are energized when the electric circuitry is appropriately interconnected as is hereinafter more fully explained.

This solenoid operation of the colon, and / keys permits the automatic initiation of the punch zone and number end signs by means of the teeth 45 and 49 since the closing of the corresponding switches 46 and 50 completes the circuit to the solenoids 82 and so effects the necessary printing and perforating.

The solenoid operation of the W (cancel) sign ensures that this sign and its corresponding code are printed and perforated when the delete key is depressed. The switch 9 on this key acts to complete the circuit to the solenoid of the W key.

The back space key lever (corresponding to the key lever 72 in FIG. 5) includes only a solenoid, the circuit to which is completed when the back-space key 12 is depressed. In FIG. 4, a key (outlined by a dash line) is marked B/S. This was for normal back-spacing. For the purpose of this invention the key top has been removed rendering it manually inoperable. The normal back-spacing mechanism, other than the key top, remains in situ and is operated step by step when the circuit to the solenoid is completed by depression of the key 12 as above explained.

Figure 12:
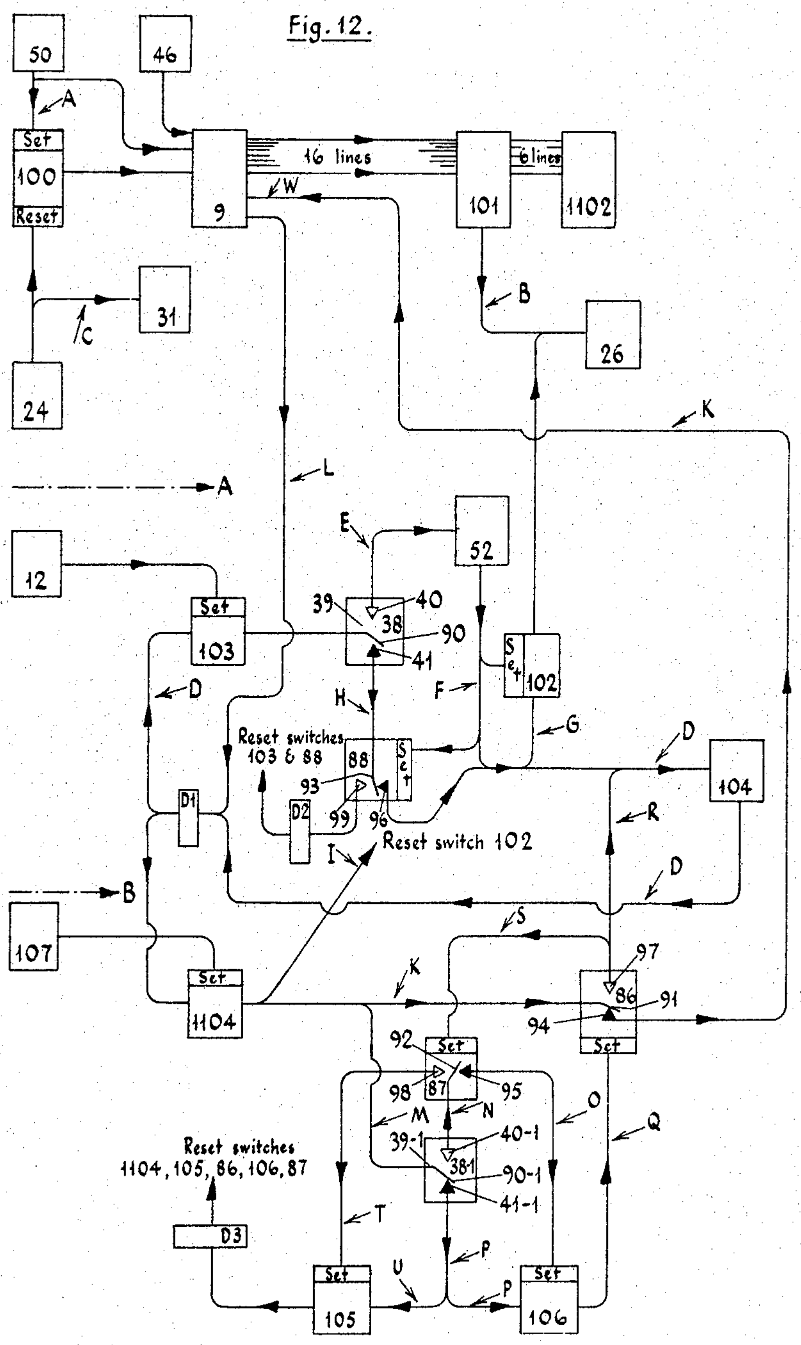
FIG. 12 is a block electrical diagram showing the electric circuitry associating the typewriter with the punch mechanism.

Referring now to FIG. 12, this is a block electric diagram showing the electrical circuitry required to connect the typewriter 1 with the punch 3 so that errors may be corrected without interferring with the continuity of the punch tape 51.

The components and wiring in FIG. 12 are arranged in such a manner that it may be considered roughly as three sections. The upper section as far as the chain arrow A being the connections and components required for normal typing and recording, the middle section as far as the chain arrow B being the additional wiring and components required for back spacing the carriage and punch tape 51 as far as the error, and the remainder (lower part) of the figure being the additional wiring and components required for deleting and returning the carriage to the error for re-typing and re-recording.

So far as the switch 38, 38–1, which as previously mentioned is in fact a single component, the switch 86, the switch 87 and the switch 88 are concerned, it should be noted that when the switch arms 90, 90–1, 91, 92 and 93 are in contact with the hatched arrow head terminal 41, 41–1, 94, 95, 96, they are said to be reset, and when they contact the open head arrow 40, 40–1, 97, 98, 99, they are said to be set.

The other switches 100, 102, 103, 1104, 105, 106, are normally open but when, as will hereinafter be explained, they are set by the actuation of some component, it means that they are closed so that an electric current can pass through, when reset no current can pass.

The various components marked D for delay are intended to indicate an electrical arrangement that is not instantaneous in action (e.g. a solenoid to close a switch) to ensure that the component to which the delay is connected will operate at least fractionally later than the component from which the current emanates.

Referring to the upper section of FIG. 12, it is to be understood that a continuous current of electricity is applied to the switch 100 and that, when not in operation, this switch is in reset condition.

It will be seen that there are sixteen lines connecting the type key switches 9 and an encoding matrix 101. This encoding matrix is of a known type and acts, when any particular key line is energized by closure of its switch 9, to complete a cicuit to the appropriate punch solenoid or solenoids 1102.

Thus it will be observed that there are six lines connecting the matrix 101 to the solenoids, one for each solenoid, and supposing the key for number two is depressed, the corresponding line of the sixteen is energized to operate the matrix 101 to energize the top two and the bottom but one solenoids (as seen in FIG. 2) so that those corresponding pins in the punch pass through the tape to perforate it.

The upper section of FIG. 12 operates in the following manner:

When information is typed in column 7 (see FIG. 1) normal printing on the sheet 5 takes place. As soon however as the carriage reaches the punch zone so that the switch 50 is closed by the tooth 49, this action passes an electric pulse through line A to set the switch 100 so that current passes therethrough to one terminal of each of the type key switches 9. At the same time the pulse passes to the solenoid of the block end type bar to type a colon at the start of column 8 and operation of the block end key lever 72 passes a pulse through the encoding matrix 101 to operate the appropriate solenoids 1102 to perforate the corresponding code on the tape.

The switch 100 remains set and passes current to the type key switches 9 so that each time a key is depressed the corresponding number is printed on the sheet and punched on the tape by the solenoid or solenoids 1102.

As the carriage moves along a tooth 45 strikes the number end switch 46 and this acts to print a / sign and simultaneously perforate the tape in a similar manner to the block end sign above referred to.

In addition to printing and perforating as above described, a pulse from the encoding matrix for each type key or block end or number end sign passes through line B to the tab set solenoid 26 (see FIG. 6) so that a tab is set for each perforation.

When a line of type in column 7 and 8 to 8–4 has been completed, the carriage return key 24 is depressed and this completes a circuit to return the carriage to the start of the next line and also to turn up the platen ready for typing. Depressing tthe key 24 acts to reset switch 100 so that current is cut off from the key switches 9, and also to pass a current through line C to operate the reset tab solenoid 31 so that the chamfered end 33 of the bar 32 rubs against the lower edges of the tabs 14 to raise them to their reset position 13.

So far as the sheet 5 shown in FIG. 1 and the tape 51 shown in FIG. 3 are concerned the above procedure is employed to type all characters on the sheet and to punch perforations in the tape corresponding to the information contained in the columns G8 to G8–4, P8 and P8–4 and 8 to 8–4 down to the end of the third line.

It will be seen that an error has occurred in line 3 column 8-1 in that 3000 was typed in error for 200, and it is assumed that the operator notices this at the end of that line.

The section shown in the middle section of FIG. 12 then comes into operation.

First of all it must be appreciated that the switch 100 is still set, as the carriage return key has not been depressed, furthermore, it will be assumed that the operator has moved on say three spaces beyond the 3000, without of course setting any tabs.

The carriage back space key 12 is then depressed and this acts to set switch 103, and to permit an electric pulse emanating from the switch of a carriage back space solenoid 104, to pass along line D, through delay D1, switch 103, switch 38 via terminal 41 and line H, and switch 88, via terminal 96, back to the carriage back space solenoid 104 to continue its step by step back spacing.

This movement continues until the first set tab is reached i.e., the tab set when the last 0 of 3000 was typed and punched. Due to this tab being in its set condition the light beam shines on the window 37 and this acts to set the switch 38. Thereafter pulses emanating from the carriage back space solenoid 104 pass via terminal 40 of switch 38 and line E to the punch back space solenoid 52 (see FIG. 8), thence via line F to the carriage back space solenoid 104. It will be observed that the pulses passing along line F also act to set switches 102 and 88, and that the said pulses therefore pass through switch 102 via line G to the tab setting solenoid 26 to set all tabs not so far set, between groups of recordings as hereinafter more fully explained.

This step by step back spacing movement of the punch and carriage continues until the light beam is obturated again from the window 37, that is to say until the first unset tab at the right hand end of the tab bar 11, as viewed in FIG. 4, is located in the light beam.

The consequent energization of the photo-cell 34 acts to move the switch 38 again to its reset condition (as shown in FIG. 12) and so cuts off pulses to the punch back space solenoid 52 and carriage back space solenoid 104. The last pulse emanating from the carriage back space solenoid 104 passes through line D and H to switch 88 and through delay D2 resets said switch 88 and the switch 103. It should be noted that switch 102 remains set.

The above is all that is required to reach the error in line 3 of column 8–1 in FIG. 1, but supposing the error has occurred in column 8, then a further depression of the back spacing key 12 would be required and this, due to the switch 102 being in set condition, would set the tabs between the two groups i.e., those corresponding to the three spaces between the / and last 4 in :44, and would halt the carriage and tape at the :.

To recapitulate this back spacing movement, it is pointed out that if the key 12 is operated when an unset tab is located between the light and the photo-cell, back spacing of the carriage commences. As soon as a set tab arrives, due to back spacing the carriage, between the light and photo-cell, back spacing of the punch commences. This step by step movement of the carriage and punch then continues until the first unset tab arrives between the light and photo-cell, whereupon both back spacing movements are halted. Thus a change from a series of unset tabs to a series of set tabs brings into operation the punch back space solenoid, and a change from a series of set tabs to one or a series of unset tabs, halts both carriage and punch.

It should perhaps be mentioned that when the carriage and punch halt at e.g. / sign of the /3000, it is the tab of the position immediately to the left of the / that brings about the halting.

The next operation is to cancel the whole of the column in which the error occurs and all other perforated characters to the end of the line, and this involves the lower part of FIG. 12.

The various connections and components are now as shown in FIG. 12 bearing in mind that the switch 100 is still set, as is also switch 102. Furthermore it will be recalled that all tabs are set.

The delete key 107 is then depressed to set switch 1104 and this first resets switch 102 via line I. Setting of the switch 1104 permits an electric pulse, derived from the switch 100, to pass through the switch 9 of the delete key, via line L, delay D1, switch 1104, switch 86 and line K to close the circuit to the solenoid 82 of the W key. This operation of the W key prints a W on the sheet and, via one of the sixteen lines, operates all six of the punch solenoids 1102 to cancel the code on the tape.

It will be appreciated that the first movement of the carriage during deleting will permit the light to shine on the window 37 again because the first tab and all succeeding tabs are in their set condition (14) so that the switch 38–1 will immediately move to its set condition with the arm 90–1 in contact with terminal 40–1. Thus in addition to the printing and recording of the second and subsequent W's, the pulses passing along the line L will pass from switch 1104 through line M switch 38–1, line N, switch 87 and line O to set switch 106.

Each operation of the W solenoid directs a further electric pulse via line L, delay D1, switch 1104 and line K to print another W and so on until the first unset tab (at the right hand end of the tab bar 11 as seen in FIG. 4) is reached, i.e. the succeeding tab to the tab of the third 0 of 3000. When this occurs the switch 38–1, due to the beam of light being obturated, moves again to connect the arm 90–1 to the reset terminal 41–1, so that the next pulse along the line L will pass along line M through switch 38–1, line P, switch 106 and line Q to set switch 86, thus cutting off pulses to the cancel key (W) via line K, but permitting the pulse to pass to carriage backspace solenoid 104 via line R. The pulses then emanating from the carriage back-space solenoid 104 continue via line D, delay D1, switch 1104, switch 86 and line R to continue the back-spacing until the light beam is obturated again from the window 37, that is to say until the first unset tab at the right hand end of the tab bar 11, as viewed in FIG. 4, is located in the light beam.

The first pulse passing through switch 86 also passes through line S to set switch 87, and a subsequent pulse passes through line M, switch 38–1, line N, switch 87, line T to set switch 105.

When said first unset tab at the right hand end is reached the switch 38–1, due to the light beam not shining on the window 37, moves again to reset condition (arm 90–1 connected to terminal 41–1) so that the final pulse passes through lines P.U. switch 105 which through delay D3 acts to reset switches 1104, 105, 86, 106 and 87 thus stopping the movement of the carriage.

It will be noted that during this last return motion of the carriage, the punch is not back-spaced so that when the corrected figures (in this case /200) are printed, they are perforated on the tape beyond the cancelled perforations as can be seen from FIG. 3.

It will be further noted that during the return motion of the carriage the tabs are not reset. The reason for this is that the required wiring and components to effect resetting of the tabs are rather complex and it was not considered that the added complication was essential, since it is most unlikely that the operator would make a second error when correcting.

It will further be observed that the switch 100 is only reset (in other words the electric current to the key switches 9 is only cut off) when the carriage return key is depressed.

Reference has been made in the appended claims to "a field of error" and this means all figures in the punch zone from the error to the last typed character in that line of the punch zone.

We claim:

1. Apparatus for controlling an electrically-operated typing machine having a carriage and co-acting punch recording mechanism having a tape so that a character printed in error on a sheet in the carriage of said machine and selectively recorded on a tape by said punch mechanism may be corrected, said apparatus comprising; identifying means set on the printing of a recordable character for identifying the fact of said printing and recording at a given printing position on the typing machine, a primary electric control circuit rendered effective by the operator to return the carriage and the tape to error correcting positions, a secondary electric circuit rendered effective by the operator to cancel the error and all subsequent characters on the sheet and tape, and to back-space the sheet-holding carriage of the typing machine to the error position while the tape is held stationary, whereby characters may then be re-typed on the sheet and simultaneously re-recorded on the tape beyond the cancellation, the extent of the back-spacing and cancelling movement of the carriage, and of the return and cancelling movement of the tape being controlled by the setting of the said identifying means.

2. Apparatus as claimed in claim 1, characterised by the provision in the control circuitry of sensing means controlled by the said identifying means for modifying the electric circuit to initially operate the mechanisms adapted to return the carriage and tape to the place of error, then to cancel characters both on the sheet and the tape, and finally to return the carriage only to the error so that corrected characters may then be typed on the sheet in the area of the cancellations and re-recorded on the tape beyond the cancellation.

3. An apparatus for sequentially printing characters on a sheet of material and simultaneously recording selected characters in encoded form on a record medium, and an error correction means for correcting errors made in the printing and recording of characters comprising; a printing device for printing a line of characters, said device having a plurality of printing positions, a recording device for recording selected printed characters in code on a recording medium, an identifying means for identifying whether a selected character which is simultaneously recorded on the recording medium, is printed at each printing position, said identifying means comprising a movable element having an unset position and a set position indicating the absence or presence of a selected printed character at each printing position respectively, a returning means for moving the said printing device and recording device backwards to reach a printed error, cancelling means for moving the printing device and the recording device forward again and cancelling the printed and coded characters, including the erroneously printed characters, from the position to which the printing and recording devices had moved backwards, to the end of the line, said returning means and said cancelling means being operable in response to the position of the movable elements of the said identifying means.

4. An apparatus as claimed in claim 3 and including a means operable upon completion of the operation of the cancelling means for returning the printing device only to the printing position whereat the cancelling means commenced operation so that correct selected characters may be printed on the line in the area of the cancelled printed characters and on the record medium beyond the area of the cancelled coded characters.

5. An apparatus for sequentially printing characters on a sheet of material and simultaneously recording selected characters in encoded form on a record medium, and an error correction means for correcting errors made in the printing and recording of characters comprising;

(a) a printing device comprising a first member for mounting a sheet of material and having a plurality of character printing positions, and a second member for mounting printing keys and having a printing reference position, one of said members being a movable member and being movable relative to the other member, (b) a recording mechanism comprising a first element for mounting a recording medium and a second element for mounting an encoding device and having an encoding reference position, said encoding device being adapted to place a code onto the recording medium representing a selected character at the printing device when that selected character is caused to be printed at the printing device, one of said elements being a movable element and being movable relative to the other element, (c) identifying means operatively associated with one of said members for identifying at which of said printing positions there has been printed a selected character and for which a code has been placed onto the recording medium, one or more successive identified printing positions being a group of identified characters, (d) a first returning means for returning said movable member from any position backwards to, and halting it when the first identified printing position of the group arrives at the said reference position, (e) a second returning means operative in cooperation with the first returning means for returning the said movable element of the recording mechanism backwards until the code on the record medium representing the first selected character of the said group is moved to the said encoding reference position, (f) a cancellation means for moving the said movable member and movable element forward at least to the last identified printing position of the said group while simultaneously printing cancellation marks over the printed characters of the said group and placing a cancellation code over the codes of the selected characters of the group on the record medium, (g) and a means operable automatically upon the termination of the printing of cancellation marks, for returning only the movable member, but not the movable element, to the first identified printing position of the said group.

6. Apparatus as claimed in claim 5 wherein said first and second returning means, said cancellation means, and said means operable automatically are all controlled by a two-way switch means, and a sensing means sensing whether the said identifying means has been operated to indicate the printing and encoding selected characters at certain printing positions, and said switch means being operable in response to said sensing means.

7. Apparatus as claimed in claim 6 wherein said sensing means is a photoelectric device.

8. Apparatus as claimed in claim 6 wherein said identifying means comprises a tabulator element for each printing position, said tabulator element having an unset condition indicating that no selected character has been printed at that printing position, and a set condition indicating that a selected character has been printed at that printing position, and the sensing means is a photoelectric device which is mounted to sense whether certain tabulator elements are in the set or unset condition.

9. An apparatus as claimed in claim 5 wherein the operation of said first and second returning means are initiated by a key, and said returning means are constructed to be operated optionally, if desired, at least a second time prior to any forward movement of said movable member and said movable element, to return the movable member and movable element to the first identified printing position and to the code of the first selected character on the record medium respectively, of a second group of identified characters preceding the first said group on the line of printed characters, and means automatically operable during said return movements for identifying previously unidentified printing positions between the first and second groups so that the first and second group then comprise a single group, the characters of which are subject to cancellation by the said cancellation means.

10. Apparatus as claimed in claim 9 in which the printing device comprises an electrically operated typewriter, the movable member is a movable carriage, and the said second element of the recording mechanism comprises a fixed tape punch controlled by the typewriter and the first element is the movable element and mounts a movable tape recording medium.

11. Apparatus as claimed in claim 10 wherein the said identifying means is mounted on the electrically operated typewriter and includes a tabulator bar mounted on the carriage and having a series of tabulators, one of which is displaced to a set condition by the typing of a character that is also recorded on the tape, thus identifying that that position where the character was typed is an identified printed position.

12. Apparatus as claimed in claim 11 in which the said first and second returning means comprise primary electric control circuitry operable to return the carriage and tape until the first displaced tabulator of a group of identified characters is moved to a position whereat the characters of the position corresponding to that tabulator are at the said reference positions.

13. Apparatus as claimed in claim 12 wherein the said circuitry is operable optionally, if desired at least a second time, prior to any subsequent forward movement of said tape and carriage to move the carriage and tape until the first tabulator of a second group, preceding the said first group, is moved to a position whereat the characters of the position corresponding to that tabulator are at the said reference positions, and said circuitry is also operable to displace all unset tabulators between the first and second groups to a set condition.

14. Apparatus as claimed in claim 12 in which the cancellation means comprises secondary electric control circuitry operable to move the carriage and tape forward at least to the last set tabulator, while simultaneously printing cancellation marks over the printed characters of the said group and placing a cancellation code over the codes of the selected characters of the group on the tape, and the said means operative automatically being operable to return the carriage so that the first printed character of the group is adjacent the reference printing position, while the tape is held stationary.

15. Apparatus as claimed in claim 14 in which operation of the secondary circuit renders said circuit effective to direct an electric pulse to a carriage driving solenoid and a punch driving solenoid, and a printed character cancelling solenoid and a punched character cancelling solenoid, thereby to cancel the printed and punched characters as the carriage and tape move forward, and wherein each movement of the printed character cancelling solenoid closes a switch to direct a further pulse through the control unit to the printed and punched character and punch driving and cancelling solenoids.

16. Apparatus as claimed in claim 15 wherein a setting switch for a reset tab solenoid is included in the secondary circuit.

17. Apparatus as claimed in claim 16 in which an isolating switch is electrically connected in the secondary circuit and the sensing switch is connected in a branch from said circuit whose end is connected to a setting switch for the isolating switch, while beyond the sensing switch the branch is divided into two parallel paths one of which leads to a one way switch whose second terminal is connected to the setting switch for the isolating switch and the other path leads to a setting switch for the one way switch, whereby when the sensing switch is in its set condition it acts to set the one way switch and when the sensing switch is moved to its reset condition it passes a pulse through said one way switch to set the isolating switch and thus cut off pulses from the carriage driving solenoid.

18. Apparatus as claimed in claim 17 in which setting of the isolating switch acts to direct pulses to the carriage back-space solenoid and to the setting switch of a two-way switch the common terminal of which is connected to the sensing switch and the terminal of which connects to a setting switch of a resetting switch whereby, when the sensing switch moves again to its reset condition the final pulse passes through the resetting switch to reset all switches and thereby bring the carriage to rest.

19. Apparatus as claimed in claim 12 comprising a two-way sensing switch in the control circuitry, the movement of which to complete one circuit or the other is controlled by the tabulators, an unset tabulator effecting movement of the switch to close one circuit and a set tabulator effecting movement of the switch to close the other circuit.

20. An apparatus as claimed in claim 19 in which the sensing switch is controlled by a photoelectric cell so that when light to the photoelectric cell is obturated by the presence of an undisplaced tab the switch is moved to one position, and when light is allowed to shine on the photoelectric cell due to the presence of a displaced tab the switch is moved to its second position.

21. Apparatus as claimed in claim 19, in which the sensing switch is a mechanical switch adapted to be moved to one position by a displaced tabulator and to its second position by an undisplaced tabulator.

22. Apparatus as claimed in claim 19 in which operation of the primary circuit renders the circuit effective, through the said sensing switch, to direct an electric pulse to a carriage backspacing solenoid, thereby to move said carriage back one space, wherein each said movement of the carriage closes a switch to direct a further pulse through the sensing switch to said back spacing solenoid.

23. Apparatus as claimed in claim 22 in which when the carriage is backspaced to a position where the said sensing switch is moved to its reset condition, due to the presence of a displaced tabulator, and the electric pulses are directed through a punch back spacing solenoid prior to reaching the carriage back space solenoid.

24. Apparatus as claimed in claim 23 in which the pulses directed through the punch tape backspace solenoid are also directed to a stop switch, to set said stop switch, and to a tabulator setting switch to set same and through said tabulator setting switch to move the tabulators to their displaced condition.

25. Apparatus as claimed in claim 24 in which when the carriage is back-spaced to a position where the sensing switch is moved to its set condition again, due to an undisplaced tab, the next electric pulse from the carriage back spacing solenoid is directed through the set stop switch which breaks the circuit to the punch tape and carriage back-space solenoid and to the stop switch setting switch to reset said stop switch.

References Cited by the Examiner

UNITED STATES PATENTS

| | | | |
|---|---|---|---|
| 2,846,007 | 8/1958 | Barbau | 164—103 |
| 3,061,192 | 10/1962 | Terzian | 235—157 |

ROBERT C. BAILEY, *Primary Examiner.*

M. LISS, *Assistant Examiner.*